T. H. McCRAY.
Smut Mill.
No. 8,827.    Patented March 23, 1852.
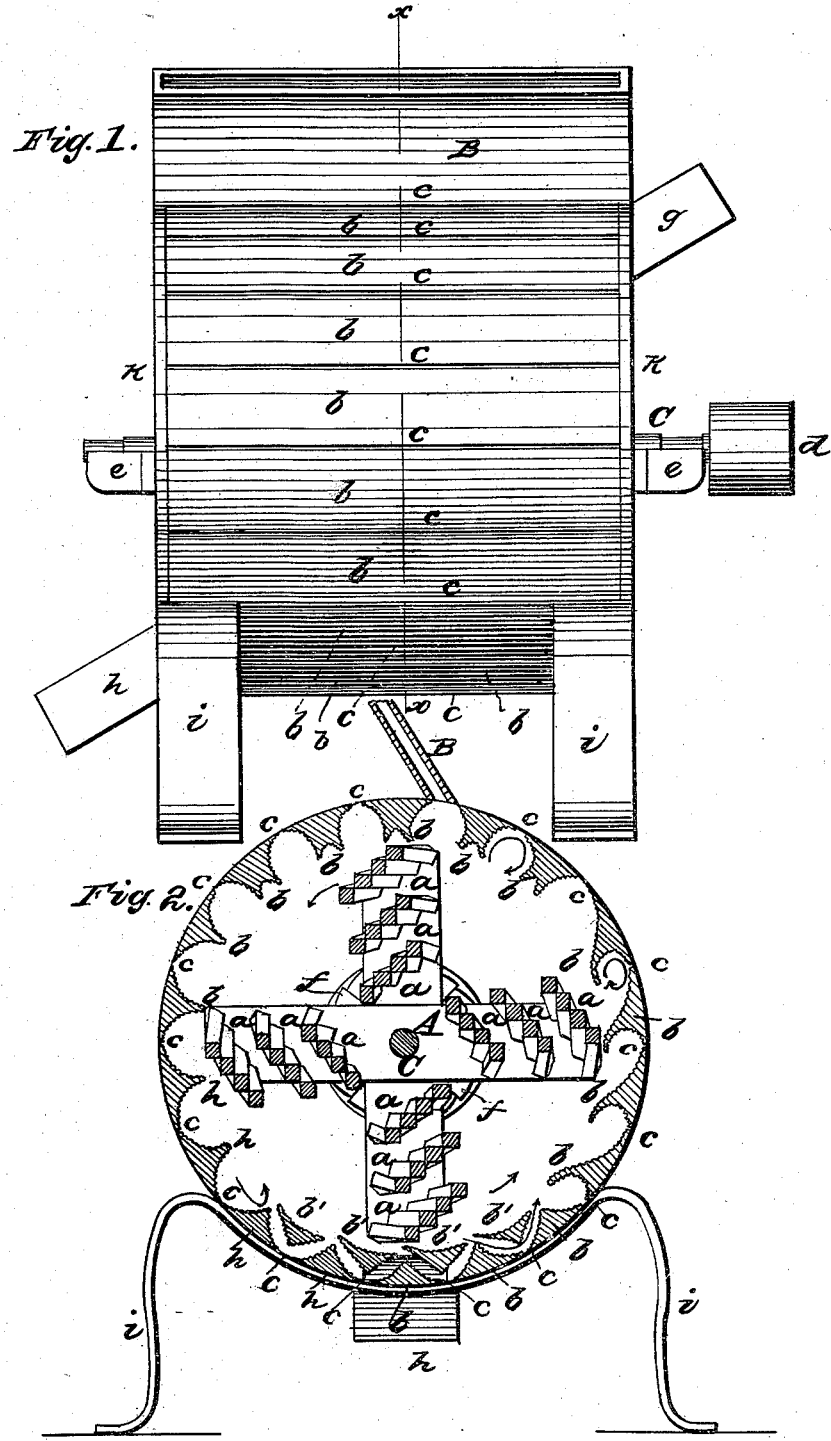

UNITED STATES PATENT OFFICE.

THOS. H. McCRAY, OF MADISONVILLE, TENNESSEE.

SMUT-MACHINE.

Specification of Letters Patent No. 8,827, dated March 23, 1852.

*To all whom it may concern:*

Be it known that I, THOS. H. MCCRAY, of Madisonville, in the county of Monroe and State of Tennessee, have invented a new and Improved Machine for Removing Smut from Grain; and I do hereby declare that the following is a full and exact description thereof, reference being had to the accompanying drawings, making part of this specification, in which—

Figure 1, is a side elevation of my improved smut machine, and Fig. 2, a vertical section of the same, in the line $x$, of Fig. 1.

Like letters refer to like parts in both figures.

My said mill is composed of a cylinder, having a series of bars $b$, $b$, &c., arranged around in its periphery, at a distance from one another sufficient to allow smut, small seeds and blighted grain, but none of the sound grain, to pass between; said bars having concavities on their internal surfaces so formed that the grain, when put in motion by the beater A, shall continually rebound against the beater and among the bars till it reaches the discharging spout $h$.

I usually construct the bars $b$, $b$, &c., of cast iron, and so proportion them that their radial shall be about two thirds of their circumferential dimensions, but limit myself to no particular material or dimensions. The ends of said bars are attached to the circular plates $k$, $k$, which form the heads of the cylinder. The concavities are formed with a view to present as much rubbing and rebounding surface as possible, and so shaped in reference to their position in the cylinder, and the direction in which the beater A, revolves, that no grain shall be allowed to lodge in any of them, but repeatedly rebound in directions indicated by bent arrows in Fig. 2. Their surfaces are corrugated, in order to act more effectually in breaking the smutty grains, and polishing the sound grains, which is essential for cleansing them thoroughly from the smut, but which only my improved machine accomplishes. The impurities are expelled through the apertures $c$, $c$, &c., by the centrifugal force given by the beater A, and by a current of air produced by the fan $f$, or other device which draws the air in at the center and expels it at the circumference of the cylinder. The chaff and other light impurities, which are not expelled through the apertures $c$, $c$, &c., are blown out by the spout B, situated near the top of the cylinder and inclining in the direction of the motion of the beater A. The grain is introduced through the spout $g$, near the top at one end of the cylinder, and is discharged at the spout $h$, situated at the bottom of the other head of the cylinder. The beater A, is composed of several concentric grooved plates, or rows of slats $a$, $a$, &c., reaching from end to end, arranged obliquely to the radii of the cylinder, and winding slightly around the axis, by which the grain, as it revolves, gradually moves from the end where introduced to the end where discharged. Said beater revolves in the direction shown by arrows in Fig. 2, so that the outer sides of the slats $a$, $a$, &c., shall strike the grain and force it toward the circumference of the cylinder. The grain rebounds between the plates or rows of slats $a$, $a$, &c., as well as against the bars $b$, $b$, &c.

The several forms, and the arrangement, of the bars $b$, $b$, &c., shown in the drawings, are not essential to the effectual operation of the machine, but may be varied, provided the same objects are attained, to wit,—to present a large amount of rubbing and properly rebounding surface, while none of the concavities allow the grain to lodge therein. I usually place a second row of bars $b'$, $b'$, &c., in the under part of the cylinder inside the other bars, leaving small spaces for the grain to pass behind them, in order that any grain, which may lodge at the bottom out of reach of the beater A, may not diminish the amount of rough surface facing the beater.

What I claim as my invention and desire to secure by Letters Patent, is—

The formation of a series of corrugated recesses within the periphery of the cylindrical casing of my improved smut machine, substantially of the forms represented in the drawings, when the said cylindrical casing is combined with a rotating beater which has its beating surfaces $a$, $a$, &c., arranged in positions which incline obliquely to the radii of the beater for the purpose of throwing the smut and kernels of grain into the said series of corrugated recesses, in such directions that they will in entering and rebounding therefrom, be brought in contact with their entire surfaces, and thereby produce so great an
5 amount of friction action as to break up the smut and white caps, and polish the kernels of grain without breaking the same.

The above specification of my new and improved smut machine signed by me this 11th day of October 1851.

T. H. McCRAY.

Witnesses:
J. S. Brown,
Z. C. Robbins.